United States Patent [19]

Irwin

[11] Patent Number: 5,346,059

[45] Date of Patent: Sep. 13, 1994

[54] CONVEYOR BELT MODULE

[76] Inventor: Guy Irwin, 512 Oreland Mill Rd., Oreland, Pa. 19075

[21] Appl. No.: 930,179

[22] Filed: Aug. 17, 1992

Related U.S. Application Data

[63] Continuation-in-part of Ser. No. 656,853, Feb. 19, 1991, Pat. No. 5,139,135.

[51] Int. Cl.$^5$ .............................................. B65G 17/06
[52] U.S. Cl. .................................... 198/852; 198/831
[58] Field of Search ............... 198/778, 831, 850, 851, 198/852, 853

[56] References Cited

U.S. PATENT DOCUMENTS

| | | | |
|---|---|---|---|
| 4,981,208 | 1/1991 | Jones | 198/778 |
| 5,131,526 | 7/1992 | Kaak | 198/778 |
| 5,133,449 | 7/1992 | Spangler | 198/778 |
| 5,139,135 | 8/1992 | Irwin et al. | 198/852 |

*Primary Examiner*—Cheryl L. Gastineau

*Attorney, Agent, or Firm*—George J. Brandt, Jr.; Thomas R. Morrison

[57] ABSTRACT

A conveyor belt which traverses a belt transport course that can include course turns wherein the belt traverses an arcuate path comprises a succession of link members formed as individual modules having a center body part and unitary forwardly and rearwardly facing finger sets at each of two opposite sides of the center body part. In traversing a turn, the belt shortens at a first side and lengthens at an opposite side. During a turn, tractive drive transmission for pulling a link member with a next preceding link member by way of a connecting rod passing through the two link members, the connecting rod being in tractive relationship with the rearwardly facing fingers of the preceding link member at only two locations, viz., at the rearwardly facing finger thereof most proximal the belt opposite edge, and at the rearwardly facing finger first alongside the preceding link member center body part at the side of the conveyor belt first edge. In this way, shear locations on the rod during drive are minimized and moved away from the center of the belt.

2 Claims, 4 Drawing Sheets

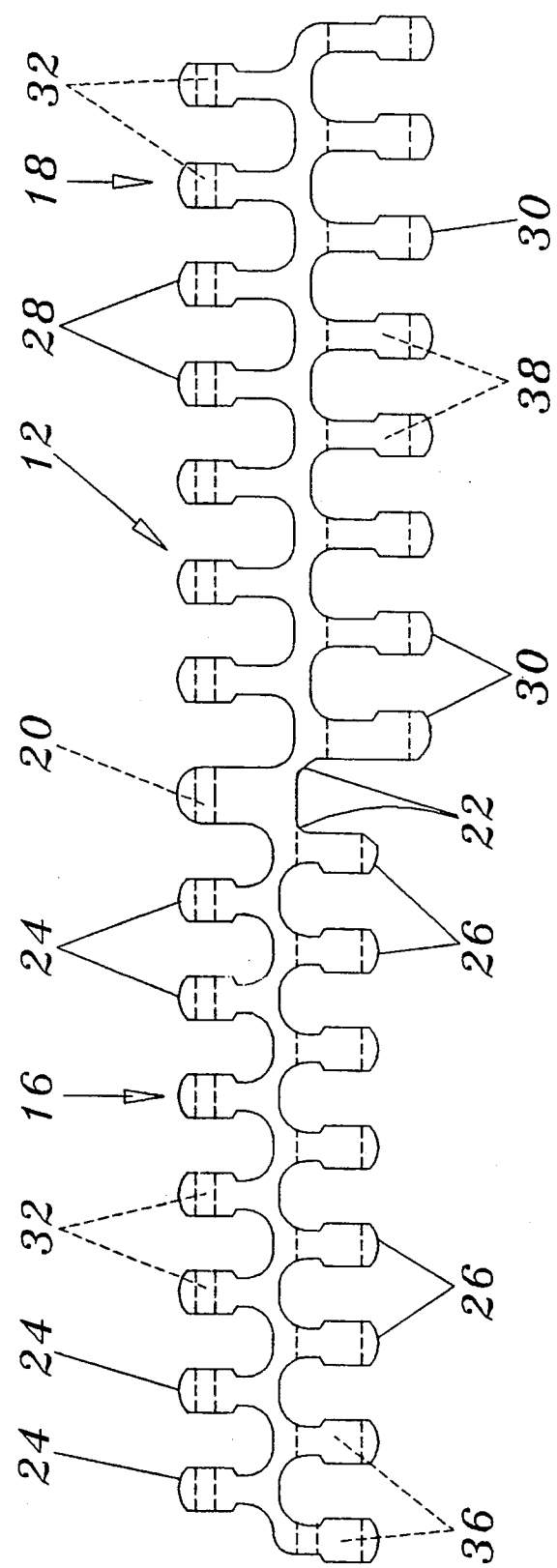

CONVEYOR BELT MODULE

This is a continuation-in-part of copending application Ser. No. 07/656,853 filed Feb. 19, 1991, now U.S. Pat. No. 5,139,135.

BACKGROUND OF THE INVENTION

The present invention relates to a plastic conveyor belt of the type which in the belt transport course thereof undergoes course turns around short radii and, more particularly, to a plastic transport belt in which a unitarily structured module having inner section, central section and outer section parts is employed as the successive link members of which the belt is comprised.

Plastic conveyor belts are becoming more widely used for a number of reasons including the advantage offered by the convenience of molding of belt components as well as simplified fabrication operations associated with such as compared to metal belts. Also in some applications such as in food industry environments, plastic is less susceptible to creating contamination problems than many of the other materials of which belts are made.

While plastic belts are attractive and effective in many applications, they become more subject to failure possibility due to loading forces acting thereon when used on spiral conveyors or in conveyor systems where the belt in its load conveying travel course transits turns. In these turns, the part of the belt at the side to which the travel course turns (inner side) longitudinally shortens or collapses, whereas, the belt part at the side remote from the inner side (outer side), elongates longitudinally or expands.

In this turn travel, a link member component at the inner side is positively driven at its inner edge by, e.g., a rotary capstan and little difficulty attends driven movement of the inner side component. On the other hand, the further removed a link member component is from the said inner edge and particularly at the outer side of the belt, the more difficult it is drive the outer side through the turn.

Such difficulty arises because drive to an outer section component must be transferred thereto from an inner section component. Where a center section component or link such as that shown at 21 in FIG. 9 of pending Ser. No. 07/656,853 is used to intervene the inner and outer section components, drive must transfer through same as well. The disclosure of the said and soon to be patented Ser. No. 07/656,853 is incorporated herein by reference.

In the transfer of drive, large shear and bending moment loadings act on a connecting rod passing through these components. Bending moment effect on a plastic rod is especially severe in the central length part of the rod. These loadings are significant too because tension must be maintained on the belt to tighten the belt inner edge against the capstan.

Commonly, the plastic material components providing the inner and outer sections of what, in effect, constitutes a complete belt transverse link member, will be plural in number. Where these plural components abut one another as seen, e.g., in the above noted pending application FIG. 8, belt deflection loading compounds shear loadings on the rod especially at the central length part thereof. The more the number of individual parts which make up the link member, the more rod flexure will occur and to a degree that can be detrimental to continued rod integrity.

With prior plastic belts including those disclosed in Ser. No. 07/656,853, shear and bending moment loadings can become so severe that rod failure occurs. Also the forces acting on the belt components during a turn can in some cases cause bearing failure in the components making up the inner and outer belt sections.

Accordingly, it is desirable that a belt construction especially applicable to plastic transport belts be provided which reduces shear and bending moment problems associated with passage of the belt through turns.

OBJECTS AND SUMMARY OF THE INVENTION

Accordingly, it is an object of the invention to provide a plastic module which serves as a link member of in a transport belt comprised of a plurality of such link members which overcomes the drawbacks of the prior art.

It is a further object of the invention to provide a plastic transport belt link member which includes link member inner and outer sections joined in unitary structure with a center section so that when a transport belt made up of such link members transits a course including short radii turns, more effective drive transfer from a belt inner section to the outer section is achieved as the belt passes through a turn wherein the inner section is required to collapse and the outer section expand.

It is a still further object of the invention to provide a plastic transport belt link member which in providing better inner side section-to-outer side section drive transmission during transit of the belt through course turns lessens adverse effect of shear and bending moment loadings on the belt by better distributing these loadings than heretofore possible and especially where plural component comprised link members have been used.

Briefly stated, there is provided a conveyor belt which traverses a belt transport course that can include course turns wherein the belt traverses an arcuate path, the belt being comprised of a succession of link members formed as individual modules having a center body part and unitary forwardly and rearwardly facing finger sets at each of two opposite sides of the center body part. In traversing a turn, the belt shortens at a first side and lengthens at an opposite side. During a turn, tractive drive transmission for pulling a link member with a next preceding link member occurs by way of a connecting rod passing through the two link members, the connecting rod being in tractive relationship with the rearwardly facing fingers of the preceding link member at only two locations, viz., at the rearwardly facing finger thereof most proximal the belt opposite edge, and at the rearwardly facing finger first alongside the preceding link member center body part at the side of the conveyor belt first edge. In this way, shear locations on the rod during drive are minimized and moved away from the center of the belt.

In accordance with these and other objects of the invention, there is provided a conveyor belt which traverses a belt transport course including course turns wherein the belt follows an arcuate transport path, the conveyor belt comprising a succession of link members arrayed transversely of the transport course and connected one link member to a next preceding link member by a transverse connecting rod passing through structure of the one and next preceding link members so that forward advance of the preceding link member tractively draws the one link member forwardly. The conveyor belt has a first side edge which shortens by longitudinal collapse of the link members at that side edge as the link members advance through a course turn, an opposite side edge of the conveyor belt lengthening by longitudinal expansion of the link members at said opposite side as same advance through the course turn. Each link member comprises a modular unit having a center body and respective inner side and outer side finger sections unitarily joined therewith extending laterally from respective ones of each of two opposite center body sides, the finger sections each including a set of forwardly and a set of rearwardly facing fingers. Spaces intervene adjacent ones of the fingers in each set so that the forwardly facing fingers of each finger section of said one link member are nestably movably receivable in the spaces intervening the rearwardly facing fingers in the finger sections of the next preceding link member, and the forwardly facing fingers of each finger section of the one link member are nestably movably receivable in the spaces intervening the rearwardly facing fingers in the finger sections of the said preceding link member. The forwardly facing fingers of each finger set of a link member have connecting rod receptive passages therein aligned with each other and with a center body passage, the passages in the forwardly facing fingers and in said center body being of substantially the same size, said size being the same as a diameter of the connecting rod. The rearwardly facing fingers of each finger set of a link member have elongated slots therein for connecting rod pass through. The slots in the rearwardly facing fingers of the inner side finger section are aligned with each other with the slots of the rearwardly facing fingers of the outer side finger section being aligned one with each other. The slots of the outer side finger section rearwardly facing fingers being longer than those in the rearwardly fingers of the inner side finger section, these being offset in a trailing direction relative the slots of the said inner side rearwardly facing fingers so that during link member advance through a course turn, each link member pivots forwardly at the conveyor belt first edge and rearwardly at the conveyor belt opposite edge. This pivoting brings a first tip end of the connecting rod passing therethrough stopped against a forward end of the slot in the preceding link member rearwardly facing finger most proximal said conveyor belt first edge, and a second opposite end of the said connecting rod in tractive drive transmitting stopped position against a rear end of a slot in the preceding link member rearwardly facing finger most proximal said conveyor belt opposite edge. In that stopped position, a mid-length part of the connecting rod lies in tractive drive transmitting stopped position against a rear end of the slot in the rearwardly facing finger of in the inner side finger section of the preceding link member which is most remote in said one such inner side finger section from the conveyor belt first edge.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4 is a plan view of one of the link members of which the belt is comprised, the depicted link member being a one-piece component made of a thermoplastic material.

DETAILED DESCRIPTION OF THE PREFERRED EMBODIMENT

Figure 1:
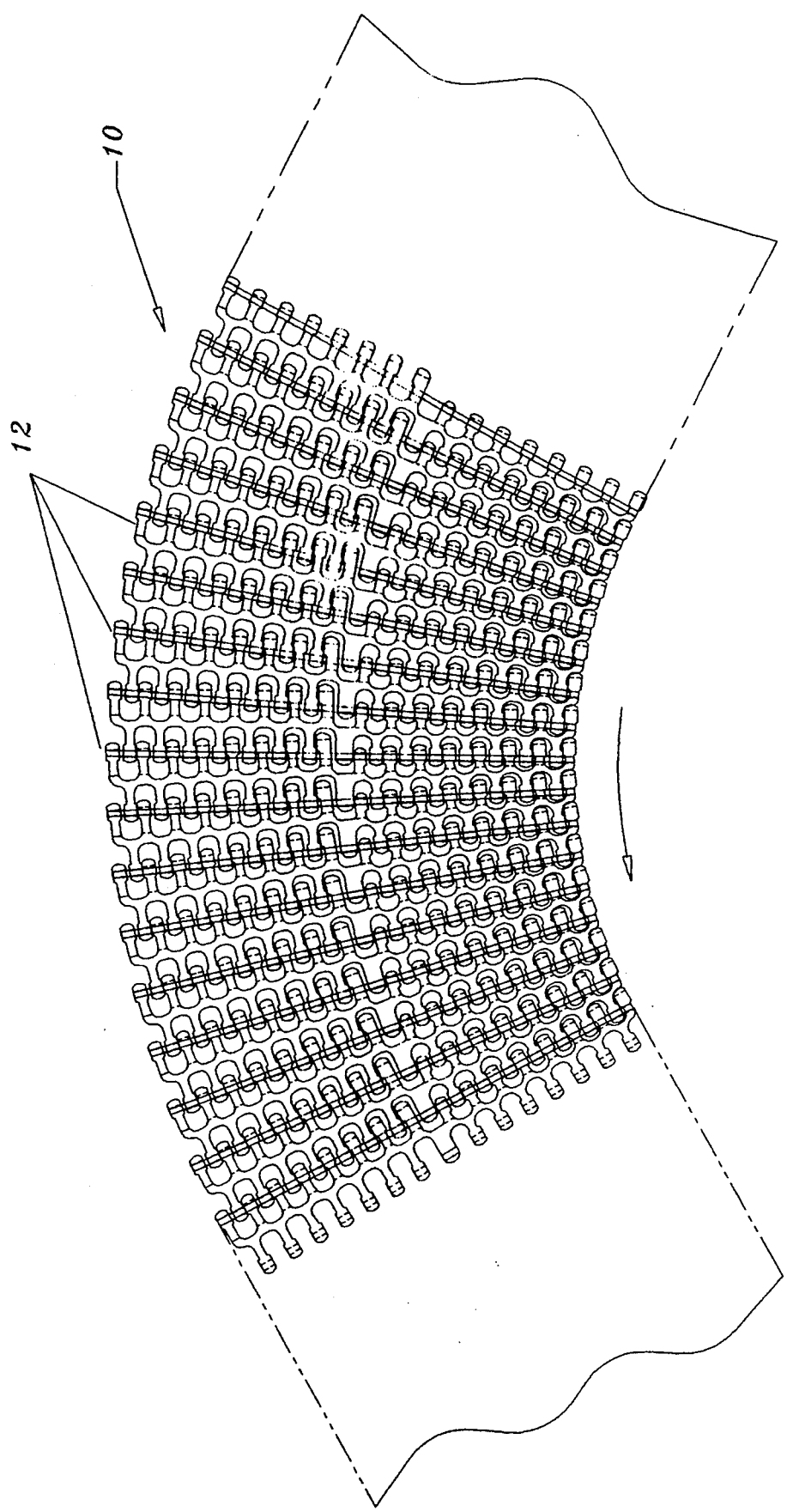
FIG. 1 is a plan view of a portion of a conveyor belt comprised of link member modules of the invention, and depicts how the belt collapses and expands at opposite sides thereof during transit of the belt through a left turn in the transport course from a transport course straight run.

Referring first to FIG. 1, there is shown a length portion only of a plastic conveyor belt 10 which in its travel or transport course transits one or more short radius turns, one such turn being shown and involving a direction change of about 45 degrees to the left. Belt 10 will be a left or right turn only type. To make a left turn belt useable for right turn operation, the belt simply needs be turned over. Commonly, belt 10 will be used on a spiral conveyor such as the type depicted in application Ser. No. 07/656,853.

In FIG. 1, it is seen the belt is comprised of a succession of transversely disposed link members 12 joined together by transverse connecting rods passing through each link member and a link member next preceding, all this to be described in detail below and for the purpose as will be detailed as well.

Referring now to FIG. 4, one of the modules or link members 12 of which the transport belt 10 is comprised, will be described. Link member 12 is a unitary or one-piece component of a plastic material and has a center body part 14, an inner side finger section 16 extending from one side of the center body part and an outer side finger section 18 extending from an opposite side of the center body part.

Figure 2:
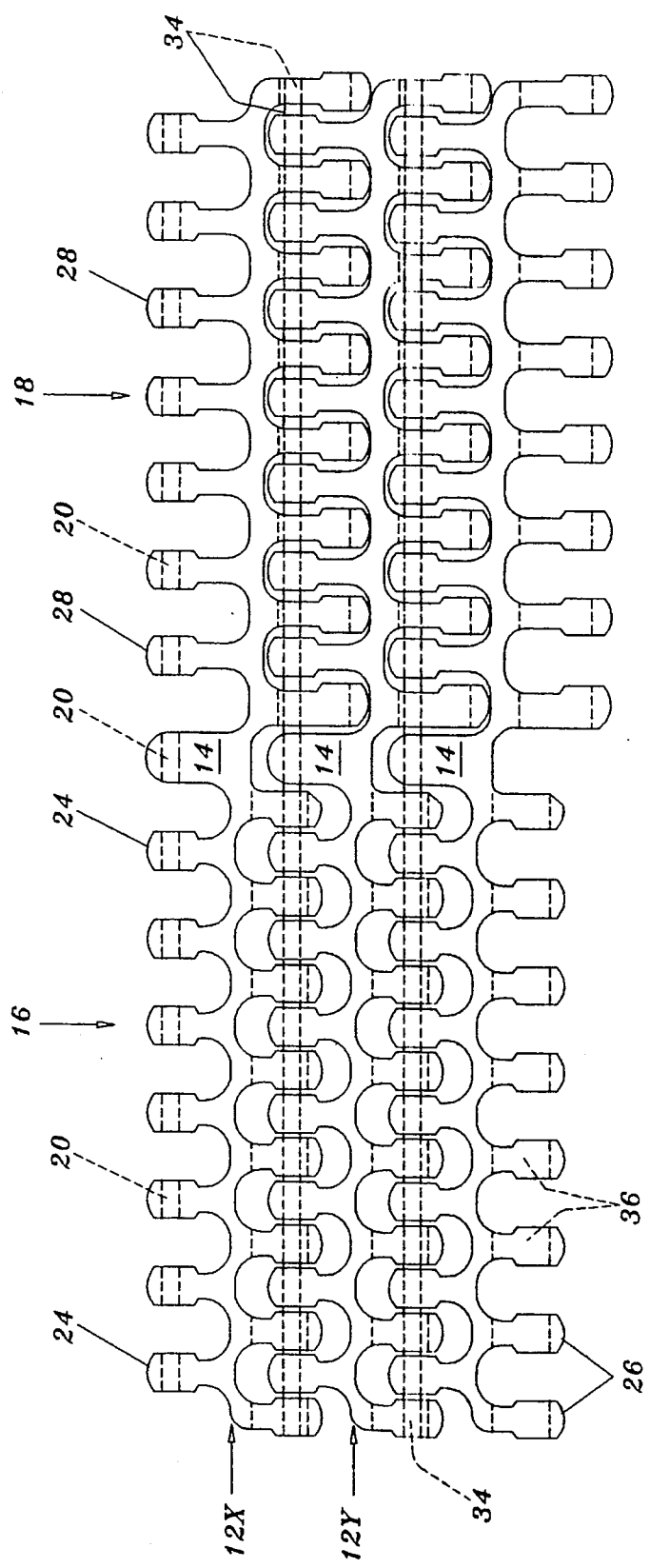
FIG. 2 is a fragmentary plan view of the conveyor belt shown in FIG. 1 on larger scale illustrating details of the link members and showing how same dispose with the belt following a straight run.
Figure 3:
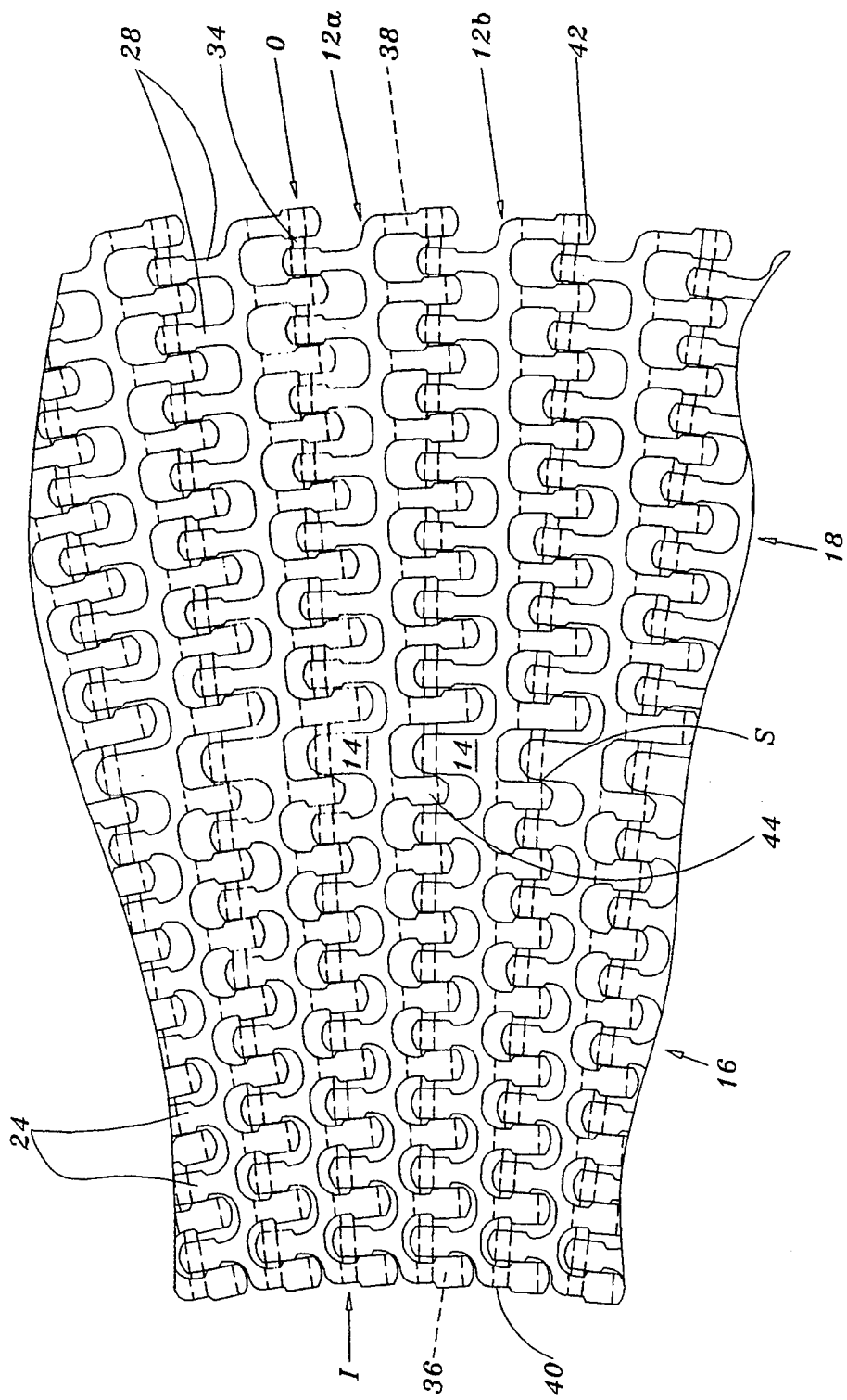
FIG. 3 is a view similar to FIG. 2 except the link members are disposed in configuration as exists when the belt moves through a left turn of, e.g., about 45 degrees.

Center body part 14 is of relatively thickened character and has a passage 20 extending therethrough at the front portion of the body part, this passage being receptive of a connecting rod 34 as seen in FIGS. 2 and 3. Center body part 14 is joined at the rear portion thereof with the respective finger sections 16, 18 as at 22, the joinder being of unitary character, as for example, by the one-piece molding of the module.

Inner side finger section 16 is comprised of a plurality of forwardly facing fingers 24, and a plurality or rearwardly facing fingers 26. Forwardly facing fingers 28 also are provided on outer side finger section 18 as are rearwardly facing fingers 30. The forwardly facing fingers 24, 28 each have a passage 32 at the front end part thereof, these passages 32 being of the same size and aligned with each other, the passage 20 in the center body part also being of that size and in alignment with passages 32 so that a connecting rod 34 (FIGS. 2 and 3) received in these passages is straight aligned and supported by the fingers 24, 28 and center body part 14 along its full length.

The fingers 24 of inner side finger section 16 are of slightly less length than the fingers 28 of outer side finger section 18, but as will be seen, the front tip ends of these fingers and that of the center body part tip end lie along a common line. The rearwardly facing fingers 26 of inner side finger section 16 are on the other hand, shorter than those 30 rearwardly facing on the outer side finger section 18.

Fingers 26 each have elongated slotted passages 36, these being of the same size and shape for each. In similar manner, Fingers 30 have elongated slotted passages 38 all of identical shape and size but being of greater length than passages 36. All of the passages 36 are in alignment with each other as are the passages 38 like aligned. Further, passages 38 are rearwardly offset a certain distance beyond the location where same have partial register with passages 36. The effect of this arrangement is to provide the module outer side finger section with a larger pitch than the inner side finger section. Selection of such pitches is readily understood by one of ordinary skill in the art.

FIG. 2 depicts the arrangement of the link members when the conveyor belt is travelling a straight line travel course. In that movement, each link member, e.g., link member 12y is tractively drawn forward by the preceding link member 12x. In that movement the rearwardly facing fingers 26 of the link members and the connecting rods are involved in drive transmission. For example, as the module or link member 12x moves in forward direction, the rod member 34 carried in fingers 24 of the following link member 12y is engaged by the rear face of the passages 36 in link member 12x so that the rod 34 of link member 12y and hence, the link member is also moved in forward direction.

Functioning of the link members 12 during belt transit of a short radius turn is described now with reference to FIG. 3. The belt has a first or inner side edge as at I and an opposite or outer side edge as at O. I n the turn, the inner edge or side collapses as the forward fingers 24 of a given link member 12b move forward in the spaces between rearwardly facing fingers 26 of a preceding link member 12a. The outer edge on the other hand expands or elongates as the forwardly facing fingers 28 of link member 12b move rearwardly in the spaces between the rearwardly facing fingers 30 of link member 12a.

This movement is precipitated by drive effected at the belt inner edge by a rotary capstan as detailed in the earlier mentioned pending application. The movement which is in the way of pivoting of the link member 12b forwardly at edge I and rearwardly at edge O results in bringing a first tip end of the connecting rod 34 passing through link member 12b stopped against a forward end of the slotted passage in the rearwardly facing finger 26 of link member 12a that is most proximal edge I as at 40.

A second opposite end of the rod is pivoted into tractive drive transmitting stopped position against a rear end of a slot in link member 12a rearwardly facing finger 30 which is most proximal edge O as at 42. In this pivoted condition of link member 12b a mid-length part of the connecting rod is in tractive drive transmitting stopped position as at 44 against a rear end of the slot in the rearwardly facing finger 26 of link member 12a which is most remote from the edge I, this finger being that most immediately on the left of the center part 14 of link member 12a.

In this manner each preceding link member 12a transmits drive to a following link member 12b at the outer side of the belt.

Because the modules 12 are one-piece construction and due to the support of the connecting rods along the lengths thereof, and especially at the outer side of the belt, drive transmission from the inner to outer belt sides is achieved with shear loading occurring at the center of the module as at S, but bending moment loading at the center as took place with prior plural component link members, is minimized. The one piece construction results in little rod flexure and hence bending loading on the rod at locations where presence of other loadings can compound the bending effect and cause rod failure, especially where the rods are of plastic material.

Because of the strengthened module character provided by the invention, the link members are most especially intended for use on plastic conveyor belts, both the modules and rods being of plastic.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a conveyor belt which traverses a belt transport course including course turns wherein the belt follows an arcuate transport path, the conveyor belt comprising a succession of link members arrayed transversely of the transport course and connected one link member to a next preceding link member by a transverse connecting rod passing through structure of the one and next preceding link members so that forward advance of the preceding link member tractively draws the one link member forwardly, the conveyor belt having a first side edge which shortens by longitudinal collapse of the link members at said side edge as same advance through a course turn, an opposite side edge of the conveyor belt lengthening by longitudinal expansion of the link members at said opposite side as same advance through the course turn, each link member comprising a modular unit having a center body and finger sections unitarily joined therewith extending laterally from each of two opposite center body sides, the finger sections each including a set of forwardly and a set of rearwardly facing fingers, there being spaces intervening adjacent ones of the fingers in each set so that the forwardly facing fingers of each finger section of said one link member are nestably movably receivable in the spaces intervening the rearwardly facing fingers in the finger sections of the next preceding link member, and the forwardly facing fingers of each finger section of the one link member are nestably movably receivable in the spaces intervening the rearwardly facing fingers in the finger sections of the said preceding link member, the forwardly facing fingers of each finger set of a link member having connecting rod receptive passages therein aligned with each other and with a center body passage, the rearwardly facing fingers of each finger set of a link member having slots therein for connecting rod pass through, one such finger set being proximal said conveyor belt first side edge and the other finger set proximal the conveyor belt opposite side edge, the slots in the rearwardly facing fingers of one finger set being aligned with each other with the slots of the other rearwardly facing finger set fingers being aligned one with the others, the slots of the said other rearwardly facing finger set fingers being longer than those in the said one finger set, and being offset in a trailing direction from the slots of the said other rearwardly facing finger set so that during link member advance through a course turn each link member pivots forwardly at the conveyor belt first edge and rearwardly at the conveyor belt opposite edge to bring a first tip end of the connecting rod passing therethrough stopped against a forward end of the slot in the preceding link member rearwardly facing finger most pro, real said conveyor belt first edge, and a second opposite end of the said connecting rod in tractive drive transmitting stopped position against a rear end of a slot in the preceding link member rearwardly facing finger most proximal said conveyor belt opposite edge, and a mid-length part of the connecting rod in tractive drive transmitting stopped position against a rear end of the slot in the rearwardly facing finger of said one such finger set of the preceding link member which is most remote in said one such finger set from the conveyor belt first edge.

2. The conveyor belt of claim 1 in which the modular unit and connecting rod received therein are made of plastic material.

* * * * *